United States Patent
Brück et al.

(10) Patent No.: US 7,261,755 B2
(45) Date of Patent: Aug. 28, 2007

(54) HEAT-RESISTANT FILTER LAYER, FILTER BODY, AND PROCESS FOR PRODUCING THE FILTER LAYER AND THE FILTER BODY

(75) Inventors: Rolf Brück, Bergisch Gladbach (DE); Jan Hodgson, Troisdorf (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 2 days.

(21) Appl. No.: 10/828,813

(22) Filed: Apr. 20, 2004

(65) Prior Publication Data
US 2004/0194440 A1    Oct. 7, 2004

Related U.S. Application Data

(63) Continuation of application No. PCT/EP02/11684, filed on Oct. 18, 2002.

(30) Foreign Application Priority Data
Oct. 29, 2001    (DE) .................... 101 53 283

(51) Int. Cl.
  *B01D 53/36*    (2006.01)
  *F01N 3/10*    (2006.01)

(52) U.S. Cl. ................. 55/385.3; 55/DIG. 28; 55/DIG. 30; 55/522; 55/527; 422/177; 422/178; 422/180; 181/228; 181/243; 181/255

(58) Field of Classification Search ............. 55/385.3, 55/DIG. 28, DIG. 30, 523, 486, 522, 527; 422/177, 178, 180, 179; 181/228, 243, 255; 60/299, 300; 427/376.6, 376.7
See application file for complete search history.

(56) References Cited

U.S. PATENT DOCUMENTS

| | | | | |
|---|---|---|---|---|
| 4,238,456 A * | 12/1980 | Jalbing | ............... | 422/172 |
| 4,256,700 A * | 3/1981 | Smith et al. | ............... | 422/177 |
| 4,279,326 A * | 7/1981 | Meineke et al. | ........... | 181/228 |
| 4,475,623 A * | 10/1984 | Gerber et al. | ............. | 181/243 |
| 4,559,205 A * | 12/1985 | Hood | ............... | 422/180 |
| 5,008,086 A * | 4/1991 | Merry | ............... | 422/180 |
| 5,322,672 A * | 6/1994 | Breuer et al. | ............... | 422/180 |
| 5,474,587 A * | 12/1995 | Dias et al. | ............... | 264/43 |
| 5,482,681 A * | 1/1996 | Sager, Jr. | ............... | 422/180 |
| 5,567,395 A * | 10/1996 | Okabe et al. | ............... | 422/180 |

(Continued)

FOREIGN PATENT DOCUMENTS

DE    37 23 887 A1    1/1989

(Continued)

*Primary Examiner*—Minh-Chau T. Pham
(74) *Attorney, Agent, or Firm*—Laurence A. Greenberg; Werner H. Stemer; Ralph E. Locher

(57) ABSTRACT

Within the framework of the purification of exhaust gases of mobile internal combustion engines, filter materials are subjected to particularly high thermal and dynamic conditions. As a result, it is advantageous to use filter materials together in a stable and durable composite. To this end, a heat-resistant filter layer made of a material through which a fluid can at least partially flow and which has at least one filter section and at least one edge area, is provided. A layer thickness that differs from that of the at least one filter section is provided in the at least one edge area.

29 Claims, 5 Drawing Sheets

U.S. PATENT DOCUMENTS 6,057,263 A * 5/2000 Takahashi et al. .......... 502/439
6,355,078 B1 * 3/2002 Wickland .................. 55/385.4
6,365,283 B1   4/2002 Brück
6,413,589 B1 * 7/2002 Li ........................... 427/376.6
6,534,021 B1   3/2003 Maus

FOREIGN PATENT DOCUMENTS

| | | |
|---|---|---|
| DE | 197 04 147 A1 | 8/1998 |
| EP | 0 134 002 A1 | 3/1985 |
| EP | 0 325 111 A2 | 7/1989 |
| EP | 0 821 145 A1 | 1/1998 |
| WO | 99/61151 | 12/1999 |

* cited by examiner

HEAT-RESISTANT FILTER LAYER, FILTER BODY, AND PROCESS FOR PRODUCING THE FILTER LAYER AND THE FILTER BODY

CROSS-REFERENCE TO RELATED APPLICATION

This application is a continuation, under 35 U.S.C. § 120, of copending international application No. PCT/EP02/11684, filed Oct. 18, 2002, which designated the United States; this application also claims the priority, under 35 U.S.C. § 119, of German patent application No. 101 53 283.0, filed Oct. 29, 2001; the prior applications are herewith incorporated by reference in their entirety.

BACKGROUND OF THE INVENTION

Field of the Invention:

The invention relates to a heat-resistant filter layer made from a material that is at least partially permeable to a fluid, to a filter body having at least one heat-resistant filter layer of this type, and to a process for producing a filter body of this type. The filter bodies are used in particular for the purification of exhaust gases from mobile internal combustion engines used in automotive engineering.

If new vehicle registrations in Germany are considered, it will be found that in 2000 around one third of all newly registered vehicles have diesel engines. By tradition, this percentage is significantly higher than in, for example, France and Austria. The increased interest in diesel vehicles stems, for example, from the relatively low fuel consumption, the currently relatively low prices of diesel fuel, but also from the improved driving properties of vehicles of this type. A diesel vehicle is also very attractive from environmental aspects, since it has a significantly reduced emission of $CO_2$ as compared to gasoline-powered vehicles. However, it should be noted that the level of soot particulates produced during combustion is well above that of gasoline-powered vehicles.

If the purification of exhaust gases, in particular of diesel engines, is considered, it is possible for hydrocarbons (HC) and carbon monoxide (CO) in the exhaust gas to be oxidized in a known way by, for example, being brought into contact with a catalytically active surface. However, it is more difficult to reduce nitrogen oxides ($NO_x$) under oxygen-rich conditions. A three-way catalytic converter, as is used, for example, in spark-ignition engines, does not provide the desired effects. For this reason, the selective catalytic reduction (SCR) process has been developed. Furthermore, $NO_x$ adsorbers have been tested for use for the reduction of nitrogen oxides.

Discussions have long been ongoing as to whether particulates or long-chain hydrocarbons have an adverse effect on human health, but to date no definitive verdict has been reached. Irrespective of this, it is clearly desirable that emissions of this nature should not be released into the environment above a certain tolerance range. In this respect, the question arises as to what filtering efficiency is actually required in order to be able to comply with the well known statutory guidelines even in the future. If current exhaust emissions from commercially available vehicles in the Federal Republic of Germany are considered, it can be concluded that most passenger automobiles certified under EU III in 1999 are also able to satisfy the requirements of EU IV if they are equipped with a filter with an efficiency of at least 30 to 40%.

To reduce the levels of particulate emissions, it is known to use particulates traps that are constructed from a ceramic substrate. They have passages, so that the exhaust gas that is to be purified can flow into the particulates trap. The adjacent passages are alternately closed off, so that the exhaust gas enters the passage on the inlet side, passes through the ceramic wall and escapes again through the adjacent passage on the outlet side. Filters of this type achieve an efficiency of approximately 95% over the entire range of particulate sizes that occur.

In addition to chemical interactions with additives and special coatings, the reliable regeneration of the filter in the exhaust system of an automobile still constitutes a problem. It is necessary to regenerate the particulate trap, since the increasing accumulation of particulates in the passage wall through which the gas is to flow leads to a constantly increasing pressure loss that has adverse effects on engine performance. The regeneration substantially includes brief heating of the particulate trap and the particulates that have accumulated therein, so that the soot particulates are converted into gaseous constituents. However, the high thermal loading of the particulate trap has adverse effects on the service life.

To avoid this discontinuous regeneration, which is a major factor in promoting thermally induced wear, a system for the continuous regeneration of filters has been developed (CRT: continuous regeneration trap). In a system of this type, the particulates are burnt by oxidation with $NO_2$ at temperatures that are already over 200° C. The $NO_2$ which is required for this purpose is often generated by an oxidation catalytic converter disposed upstream of the particulate trap. However, in particular for use in motor vehicles using diesel fuel, this gives rise to the problem that there is only an insufficient level of nitrogen monoxide (NO) that can be converted into the desired nitrogen dioxide ($NO_2$) in the exhaust gas. Consequently, it has not hitherto been possible to ensure that continuous regeneration of the particulate trap in the exhaust system will occur.

Furthermore, it should be born in mind that, in addition to non-convertible particulates, oil or additional residues of additives also accumulate in the particulate trap and cannot readily be regenerated. For this reason, known filters have to be replaced and/or washed at regular intervals. Filter systems of plate-shaped structure attempt to solve this problem by allowing vibration-like excitation that leads to these constituents being removed from the filter. However, this results in that the non-regeneratable fraction of the particulates in some cases passes directly into the environment without any further treatment.

In addition to a minimum reaction temperature and a specific residence time, it is necessary to provide sufficient nitrogen oxide for the continuous regeneration of particulates using $NO_2$. Tests relating to the dynamic emission of nitrogen monoxide (NO) and particulates have clearly demonstrated that the particulates are emitted in particular when there is no or only a very small amount of nitrogen monoxide in the exhaust gas, and vice versa. What this results in is that a filter with true continuous regeneration substantially has to function as a compensator or store, so that it is ensured that the two reaction partners are present in the filter in the required quantities at a given instant. Furthermore, the filter is to be disposed as close as possible to the internal combustion engine in order to be able to reach temperatures which are as high as possible immediately after a cold start. To provide the required nitrogen dioxide, an oxidation catalytic converter is to be connected upstream of the filter, so as to react carbon monoxide (CO) and hydrocarbons (HC)

and in particular also to convert nitrogen monoxide (NO) into nitrogen dioxide ($NO_2$). If the system containing an oxidation catalytic converter and a filter is disposed close to the engine, a suitable position is in particular upstream of a turbocharger which is often used in diesel motor vehicles to increase the boost pressure in the combustion chamber.

If these basic considerations are looked at, the question arises, for actual deployment in automotive engineering, as to how a filter of this type, which in such a position and in the presence of extremely high thermal and dynamic loads has to achieve a satisfactory filtering efficiency, is constructed. In this context, account should be taken in particular of the spatial conditions, which require a new configuration of filters. Whereas the maximum possible volume was to the fore in the case of conventional filters, which were disposed in the underbody of a motor vehicle, in order to ensure a long residence time of the as yet unreacted particulates in the filter and therefore a high efficiency, if the filters are disposed close to the engine, there is not sufficient space or room available.

For this purpose, a new concept has been developed, mainly referred to by the term "open filter system". The open filter systems are distinguished by the fact that there is no need for the filter passages to be alternately closed off by structural devices. In this context, it is provided that the passage walls are constructed at least in part from porous or highly porous material and that the flow passages of the open filter have diverting or guiding structures. These internal fittings cause the flow and the particulates contained therein to be diverted toward the regions made from porous or highly porous material. Surprisingly, it has emerged that the particulates, as a result of being intercepted and/or impacting, are retained on and/or in the porous passage wall. The pressure differences in the flow profile of the flowing exhaust gas are of importance to this effect occurring. The diversion additionally makes it possible to produce local reduced pressure or excess pressure conditions, leading to a filtration effect through the porous wall, since the above-mentioned pressure differences have to be compensated for.

The particulate trap, unlike the known closed screen or filter systems, is open, since there are no flow blind alleys. This property can therefore also be used to characterize particulate filters of this type, so that, for example, the "freedom of flow" parameter is suitable for describing the systems. By way of example, a "freedom of flow" of 20% results in that, when viewed in cross section, it is possible to see through approximately 20% of the surface area. In the case of a particulate filter with a passage density of approximately 600 cpsi (cells per square inch) with a hydraulic diameter of 0.8 mm, this freedom of flow would correspond to a substantially continuous area of over 0.1 $mm^2$. To provide a better explanation, it can also be stated that a particulate filter is referred to as open if in principle particulates can fully pass through it, even particulates that are considerably larger than the particulates that are actually to be filtered out. Consequently, a filter of this type cannot become blocked even in the event of an agglomeration of particulates during operation. One suitable method for measuring the openness of the particulate filter is, for example, to test the maximum diameter of spherical particles that can still trickle through a filter of this type. In the present applications, a filter is open in particular if spheres with a diameter of greater than or equal to 0.1 mm can still trickle through, preferably spheres with a diameter of over 0.2 mm, and in particular spheres with a diameter of more than 0.3 mm.

SUMMARY OF THE INVENTION

It is accordingly an object of the invention to provide a heat-resistant filter layer, filter body, and process for producing the filter layer and the filter body which overcomes the above-mentioned disadvantages of the prior art devices of this general type.

With the foregoing and other objects in view there is provided, in accordance with the invention, a heat-resistant filter layer. The filter layer contains a material being at least partially pervious to a fluid, at least one filter section incorporating the material, and at least one boundary region extending from the filter section. The boundary region has a first layer thickness being different than a second layer thickness of the filter section.

In particular with a view to realizing an open filter system of this type, it is an object of the present invention to provide a heat-resistant filter layer which is suitable in particular for use in the context of continuous regeneration and is especially suitable for the demands which result from this application. In this respect, the filter system has to be able to withstand the high thermal and dynamic loads in the exhaust system of a passenger automobile, which stem from the pulsed emission of very hot exhaust gas. Furthermore, it is intended to provide a corresponding filter body that is suitable for significantly reducing the levels of particulates in the exhaust system. In addition, it is intended to provide a process for producing the filter body. The filter layer should be configured in such a way that the formation of connections by technical joining, in particular brazed connections or welded connections, is promoted.

The preferred manner of producing the technical joining connection is by brazing. However, a sintering process or even welding may be used as well.

The heat-resistant layer is at least in part made from material that is permeable to a fluid and has at least one filter section and at least one boundary region. The filter layer according to the invention is distinguished by the fact that it has a different layer thickness in the at least one boundary region than in the at least one filter section. In this respect, the filter layer has different regions which each have different functions. Whereas the filter section serves primarily to filter out the particulates or the like contained in the exhaust gas and to at least temporarily store or accumulate them in cavities, pores or the like or on the filter material, the at least one boundary region serves to form connections by technical joining. Configuring the filter layer to have different layer thicknesses in these regions creates a clearly apparent spatial boundary, so that assembly errors relating, for example, to the manufacture of a filter body that has such a filter layer are avoided.

With regard to the spatial arrangement of the at least one boundary region and of the at least one filter section with respect to the filter layer, it should be noted that the filter section is preferably configured in a central region of the filter layer. The at least one boundary region is preferably formed at least close to an edge, although under certain circumstances it is also possible for the boundary region to be formed all the way around the filter section, like a frame. In this respect, it is possible to form a relatively large-area, centrally disposed filter section which is surrounded by at least one boundary region. As an alternative, it may under certain circumstances, however, also be appropriate for a plurality of filter sections to be provided, so that they are each delimited by at least one boundary region (in particular configured in a similar manner to a frame), so as to resemble a chessboard pattern. The configuration of the heat-resistant filter layer with a plurality of filter sections which are each surrounded by at least one boundary region allows relatively strong connections to be made within a corresponding filter body, since connecting adjacent filter layers in the plurality of boundary regions, which are also disposed in central regions of the filter layer, creates an areal, uniformly distributed attachment.

According to a further configuration of the filter layer, the layer thickness in the at least one boundary region is less than in the at least one filter section, in particular less than 60%, preferably less than 50% or even less than 35%. Configuring the filter layer in this way has the advantage that a larger volume is provided in the at least one filter section, which is configured with a greater wall thickness. The result of this is that sufficient pores, cavities or the like are provided in this at least one filter section, these pores, cavities or the like being used to accommodate or store, for example, soot particulates. In this case, with large pores of this type, in particular particulates with a diameter of from 100 nm to 250 nm are accumulated. The heat-resistant filter layer is preferably made from a fiber material that, for example, forms a relatively loose assembly of fibers. The assembly of fibers may, for example, be a woven or knitted fiber fabric formed from ceramic fibers, but as an alternative or in addition it is also possible to use metal fibers, sintered materials, wire fabrics or the like.

The at least one boundary region substantially contains the same material as the at least one filter section, preferably containing a compressed or compacted fiber assembly. Whereas a fluid, in particular an exhaust-gas stream, can flow through the filter material in the region of the at least one filter section, the at least one boundary region is preferably substantially impervious to a fluid. Therefore at least partial compacting of the fiber material of this nature has been performed and that a large number of cavities, openings, pores, apertures or the like have been closed up. In this respect, the reduced layer thickness is the consequence of the filter material being compressed.

The impervious nature of the filter material in the at least one boundary region results in that, for example, a connecting material or additional material (brazing material, welding additives or the like) can be applied in targeted fashion to the surface in the at least one boundary region, while preventing the joining agent or welding additives from accumulating in the interior of the fiber material when they are heated, so that they would not be available for joining adjacent filter layers. Depending on the joining agents which are required to form connections by technical joining, suitable compression is to be carried out, so that the layer thickness is reduced in the at least one boundary region, advantageously by at least 40%, in particular at least 50% or even by more than 65%. This results, in the at least one boundary region, having layer thicknesses of less than 1 mm, in particular less than 0.5 mm and even less than 0.1 mm.

According to a further configuration, the at least one boundary region, starting from an edge of the filter layer, has a boundary width of at most 30 mm, in particular of at most 20 mm, preferably of at most 10 mm or even of only at most 5 mm. Therefore in particular the edge region of the filter layer is used to form connections by technical joining. This is particularly advantageous since it is particularly these regions that are subjected to particular loads in view of the pulsating flow of exhaust gas. Configuring the filter layer to have a relatively strongly compressed filter material in the edge region prevents detachment phenomena, since the assembly of fibers is significantly stronger there. Moreover, the adjacent filter layers in a corresponding filter body are connected to one another in this edge region, with the result that vibration or flapping of these regions is also avoided. The boundary width is to be configured in particular with a view to the dynamic loads that occur in use; account should also be taken of the thermal expansion characteristics of the filter layer. In this respect, it is advantageous to select boundary regions that are as narrow as possible if the filter layer is exposed to moderate dynamic loads and moderate to high thermal loads.

Furthermore, it is proposed that the filter layer contain at least one fiber layer, which preferably has a fiber layer thickness of at most 3 mm, in particular of at most 1 mm and preferably of at most 0.5 mm. The fiber layer thickness is to be selected in particular taking account of the exhaust-gas stream that is to be purified and/or the particulates contained therein. Furthermore, it should be noted that a greater fiber layer thickness provides a greater storage volume and/or an increased number of fibers, and consequently filter layers of this type do not have to be regenerated as frequently, and consequently can be fitted even in areas which are remote from the engine, such as for example in the underbody of an automobile. In positions that are remote from the engine of this nature, the exhaust gas only reaches the temperature required for regeneration after a relatively long period of time, and consequently sufficient storage capacity for this period of time has to be provided. If it is desirable for the filter layer to be disposed in very hot areas of an exhaust system, in particular close to the engine, possibly even continuous regeneration may be ensured, and consequently in this case it is preferable to use filter layers with a very small fiber layer thickness.

An advantageous refinement of the filter layer contains at least one metal layer, which preferably delimits the filter layer on the outside and in particular has a thickness of at most 0.05 mm, preferably of at most 0.03 mm or even of at most just 0.015 mm. A fluid can preferably penetrate through the metal layer in the at least one filter section, i.e. the metal layer preferably has openings, apertures or the like. The metal layer preferably extends as far as or over the at least one boundary region, in which case the metal layer in the at least one boundary region is advantageously configured so as to be impervious to a fluid. Suitable materials for a metal layer of this type are in particular aluminum-chromium alloys, as are already known from the production of metallic honeycomb bodies as catalyst supports for the purification of exhaust gases. The metal layer may in this case be formed as a coating or as a separate foil.

It is particularly advantageous for the filter layer to be a sandwich structure and to have at least one fiber layer and at least one metal layer. In this case, the metal layer preferably forms a sleeve which surrounds the fiber layer, so that the fiber layer is disposed captively inside the at least one metal layer. In this context, the term sleeve is to be understood as meaning a configuration of the at least one metal layer in which the at least one metal layer also extends at least in part beyond the periphery of the fiber layer, in particular completely surrounds the fiber layer. In this respect, at least in part, a sleeve is formed over the entire periphery of the fiber layer. Accordingly, the metal layer surrounding the periphery of the fiber layer in this way leads to a relative movement of the fiber layer with respect to the at least one metal layer being impeded in a form locking manner in at least one direction.

The formation of a sandwich structure of this type combines a number of advantages that are of significance in particular with a view to a filter layer of this type being disposed close to the engine. The at least one metal layer forms a type of protective sleeve that protects the interior fiber layer from the pressure shocks and temperature peaks that occur. The fiber layer represents a significantly looser assembly of fibers than the metal layer. The fiber layer may in this case have a very high porosity, since the presence of a metal layer protecting it results in that it does not have to be configured primarily for strength. In this respect, it is possible in particular to realize large free spaces, pores or the like in the fiber layer. This is boosted in particular by the fact that the at least one metal layer is constructed in a form similar to a strip or sheet, i.e. offers a relatively large bearing surface area. Consequently, in this case it is possible to use fiber materials which are packed significantly more loosely than, for example, with known wire meshes which have hitherto been used to ensure the dimensional stability of the filter layers.

Since then, sandwich structures of this type have been configured in such a way that there is in each case one supporting structure disposed on both sides of the filter material (in particular braided wire fabrics), and this sandwich has then been bent or deformed into the desired shape. These sandwich structures have been disposed in the exhaust-gas stream in such a way that the periphery (or end face) of the filter material was exposed to the pulsating exhaust-gas stream without protection. This led to detachment phenomena in particular in these end regions. To ensure that the fiber material is fixed between the wire fabrics for a prolonged period of time, this sandwich structure had to be pressed together under a high pressure, over a large area (in some cases even over the entire surface area) which, on account of the resultant very small pores or free spaces for the accumulation of particulates, had noticeable adverse effects on the efficiency of the filter material and led to an undesirably high pressure loss across the filter. This is avoided in a simple way in the filter assembly according to the invention, since the fact that the at least one covering layer engages around the periphery of the fiber layer results in that the fiber layer is disposed captively in the interior.

A further aspect of the invention proposes a filter body for purifying exhaust gases from an internal combustion engine, which contains at least partially structured layers which are stacked and/or wound in such a way as to form passages through which an exhaust gas can flow. The filter body according to the invention has at least one heat-resistant filter layer as described above. The filter body can be constructed in accordance with conventional principles, such that the passages are alternately closed off, with the result that the entire flow of exhaust gas flows through the heat-resistant filter layer. However, it is preferable to use a configuration of the filter body in accordance with the "open system" described in the introduction, i.e. with a freedom of flow of at least 20%, in particular at least 40% or even of over 50%. Therefore the open filter body has cross sections through which medium can flow freely over the entire length of the passages, with a device for generating pressure differences and/or a device for influencing the direction of flow in the passage being provided within the passages. This causes the exhaust gas which is to be purified to be at least partially diverted toward the heat-resistant filter layer, to at least partially penetrate through the filter layer and thereby to cause particulates to accumulate and/or be stored in the filter material.

The configuration of the filter body with layers which contain at least one structured sheet-metal foil and at least one substantially smooth or unstructured filter layer is particularly preferred, the layers being connected to one another by technical joining, in particular by brazing or welding, in at least one connecting section. Therefore the at least one structured sheet-metal foil and the at least one filter layer are stacked and/or wound, with passages being formed as a result of the structure of the sheet-metal foil, which in principle functions as a spacer between adjacent smooth filter layers. The passages preferably run substantially parallel to one another. To ensure that a relative movement of the layers of the filter body is substantially avoided even under high thermal and dynamic loads, the layers are to be connected to one another by technical joining. In particular brazing joints or welded joints, as are already known from the production of metallic honeycomb bodies as catalyst supports in automotive engineering, are suitable for this purpose.

In this context, it is particularly advantageous for the at least one connecting section to be disposed in the at least one boundary region of the filter layer. Therefore, for example, the connecting section is preferably to be configured to be smaller than if it covered the entire extent of the filter layer. This is advantageous because in the present case two different materials (sheet-metal foil and filter layer) are being connected to one another, these materials having different coefficients of thermal expansion.

Connecting these adjacent components in just a relatively small connecting section ensures that this expansion is not significantly impeded as a result of the components being connected to one another. This has particularly beneficial effects on the service life of a filter body of this type, since the probability of cracks forming in the vicinity of the connecting section is significantly reduced. A spatially coinciding configuration of the at least one connecting section and the at least one boundary region leads to particularly durable connections, since the filter layer is impervious to the joining agent (brazing or welding material) in the boundary region, and consequently the material continues to be made available even while the connection by technical joining is being formed in the contact region between the components which are to be connected to one another.

In view of the fact that the heat-resistant filter layer according to the invention is configured with different layer thicknesses, it is particularly advantageous for there to be a method for compensating for the different layer thicknesses of the filter layer in the filter body. When an adjacent component is brought to bear against the filter layer according to the invention, the components bear against one another in a substantially form locking manner in the region of the at least one filter section. A form-locking connection is one that connects two elements together due to the shape of the elements themselves, as opposed to a force-locking connection, which locks the elements together by force external to the elements. Since, by way of example, the sheet-metal foils have a substantially planar bearing surface, but the filter layer according to the invention forms a shoulder at the transition from the at least one filter section to the at least one boundary region, a type of gap would form between the sheet-metal foil and the filter layer in the at least one boundary region. The size of the gap would be such that brazing or welding material alone would often be unable to bridge it. In this respect, there is a need for a device for compensating for this gap, which ensure contact between adjacent components of the filter body even in the at least one boundary region of the filter layer. The following text will explain, by way of example, a number of different compensation devices.

If the layer thickness of the filter layer is reduced in the at least one boundary region compared to the at least one filter section, it is proposed that the at least one boundary region have a deformation region which at least partially overlaps itself and is preferably even brazed together. Therefore that the at least one boundary region, which is in particular disposed close to at least one edge of the filter layer, is configured with a greater boundary width than a connecting section is subsequently to generate. That part of the boundary region which projects beyond the connecting section is then bent over, folded, creased or the like in such a way that these projecting regions project back into the connecting section. Consequently, partial regions of the boundary region lie adjacent to one another, preferably even bear against one another, so that the layer thickness is at least doubled at least in parts of the at least one boundary region. This is recommended, for example, for filter layers which have a layer thickness in the at least one boundary region which amounts to substantially just 50% of the layer thickness in the at least one filter section. Therefore, during the deformation of the at least one boundary region, a substantially planar bearing surface for adjacent components of the filter body is provided at least on one side of the filter layer. To prevent the deformed or bent-over partial region of the at least one boundary region from starting to flap or vibrate as a result of the dynamic loads in an exhaust system of an automobile, or even becoming detached from the filter layer, it is particularly advantageous for the overlapping part of the boundary region, which preferably bears against the boundary region itself, also to be welded or soldered to itself. In terms of a welding process, the roller seam welding process has proven particularly suitable.

According to an advantageous refinement, it is proposed that, in the case of a configuration of the filter layer with a reduced layer thickness in the at least one boundary region, that zone of a layer, in particular of a structured sheet-metal foil, which is disposed adjacent to the at least one boundary region has a height which is greater than its remaining zone. If the adjacent layer is a structured sheet-metal foil, it is particularly advantageous for this to be formed in the zone with a structure height that is greater than that of the remaining zone, with a material thickness of the sheet-metal foil preferably being equal in the various zones. Contrary to the principle described above, according to which the different layer thicknesses are compensated for by the filter layer itself, in this case it is proposed that the compensation be carried out by components disposed adjacent to the filter layer.

As has already been explained, the structure of the sheet-metal foil serves primarily as a spacer for the adjacent filter layers. Accordingly, in the case of a configuration of the filter layers with different structure heights, different distances between the adjacent filter layers are also bridged. In the case of the structure height being configured to be larger in the zone disposed adjacent to the at least one boundary region compared to the remaining zone disposed adjacent to the filter section, it is ensured that the sheet-metal foil is in contact with adjacent filter layers over the entire length of the passages, with the result that it becomes possible for these components to be connected to one another by technical joining (in particular in the at least one boundary region). Accordingly, the structure height is to be increased by a similar percentage as a reduction in the layer thickness at the transition from the at least one filter section to the at least one boundary region.

According to yet a further configuration, the filter body is provided with at least one additional compensation layer, which is preferably disposed adjacent to the at least one boundary region of the filter layer with a reduced layer thickness. Consequently, these additional compensation layers do not extend over the entire length of the filter body, but rather preferably only substantially over the connecting section in which the adjacent components of the filter body are connected to one another. In this case, the compensation layer substantially fills the gap which has been produced as a result of the reduced layer thickness of the filter layer in the at least one boundary region, and is preferably likewise connected to the adjacent components by technical joining, in particular by brazing. Under certain circumstances, it is also possible for the additional compensation layer to be configured to be longer than the at least one boundary region, in which case it at least partially projects beyond the filter layer or the at least one sheet-metal foil. The projecting subregion may if appropriate also be disposed around a boundary region of the filter layer, so that two gaps which are formed with respect to a boundary region of the filter layer in the vicinity of the edge can be compensated for using one compensation layer. In this way, the edges of the filter layer, which are exposed to particularly high dynamic loads, are provided with further protection, with the number of additional compensation layers that are to be integrated in the filter body being reduced.

A further aspect of the invention proposes a process for producing a filter body as described above. First at least one heat-resistant filter layer is produced. Then at least one boundary region of the at least one filter layer of reduced layer thickness is formed. A device for compensating for the different layer thicknesses of the at least one filter layer is provided. At least one filter layer and at least one structured sheet-metal foil are stacked and/or wound so as to form a honeycomb body with passages through which an exhaust gas can flow. A brazing material is supplied in at least one connecting section between the at least one filter layer and the at least one sheet-metal foil. Then the honeycomb body is heated in order to form brazed joints in the at least one connecting section.

With regard to the formation of brazing joints, reference is made to the known techniques used for the production of metallic honeycomb bodies as catalyst support bodies for mobile exhaust systems of automobiles. In this respect, it is preferable for nickel-based material in powder form to be used as a brazing material, with the heating of the honeycomb body preferably being carried out in a protective gas atmosphere or a virtually complete vacuum.

According to a further configuration of the process, the honeycomb body is introduced into a casing before the brazing material is supplied, with the brazing material, while it is being supplied, also adhering in at least one attachment region for attaching the at least one filter layer and/or the at least one sheet-metal foil to the casing, so that brazing joints are likewise generated during heating in the at least one attachment region. For this purpose, in a known way the connecting section and the attachment region are first provided with a bonding agent to which the pulverulent solder adheres during the operation of applying the solder. It is also known to use a device or method which limits the flow of brazing material (brazing stop, oil, wax, ceramic coating or the like) to delimit the connecting section and/or the attachment region, and these methods may also be employed here. The introduction of the honeycomb body into a casing prior to the application of brazing material that it is possible to avoid a plurality of brazing-application steps and to produce uniform joints, since these joints are exposed to the same degree of thermal treatment.

According to a refinement of the process, the at least one boundary region of reduced layer thickness is formed by the application of a compressive force to the filter layer in the at least one boundary region. The compressive force can be produced, for example, by a roller or the like, with this roller pressing the filter layer onto a die or the like, so that primarily the filter material is compacted. In this context, it is also possible for the compressive force to be exerted, for example, in parallel during a welding process. If, for example, a configuration of the filter layer with a deformed boundary region is selected, the filter layer can first be deformed in the boundary region, and then compacted and, at the same time, welded together by the roller seam welding process.

Furthermore, it is proposed that the compensation device be produced by the deformation of the at least one boundary region of the filter layer. This has already been described in more detail above.

According to yet a further configuration of the process, the compensation device is produced by at least one compensation layer being disposed between a filter layer and an adjacent foil.

Other features which are considered as characteristic for the invention are set forth in the appended claims.

Although the invention is illustrated and described herein as embodied in a heat-resistant filter layer, filter body, and process for producing it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
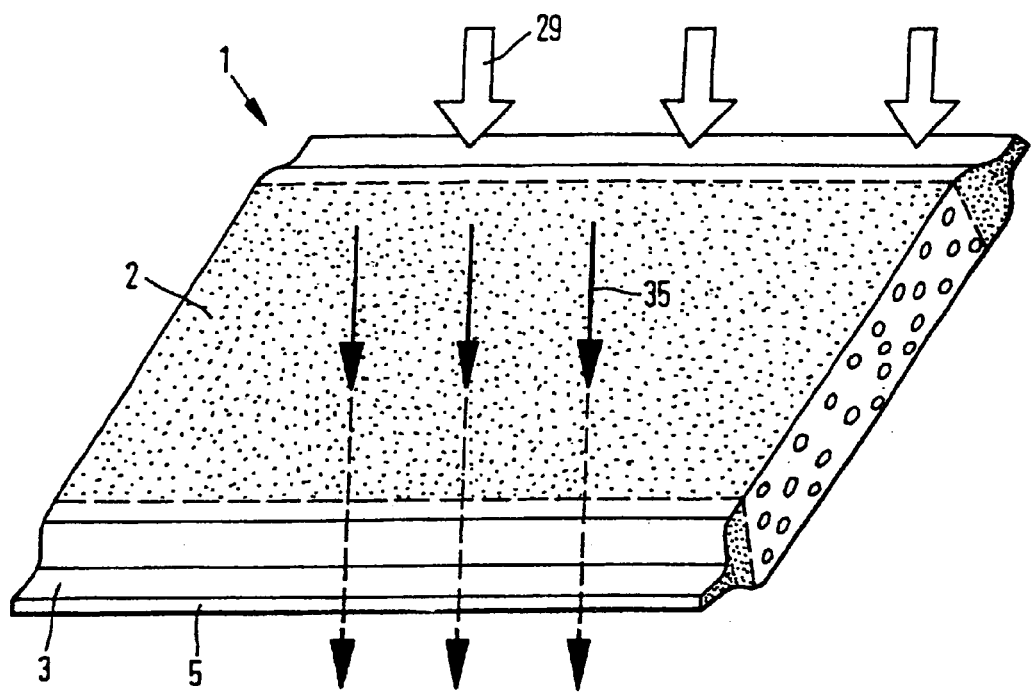
FIG. 1 is a diagrammatic, perspective view of a first embodiment of a heat-resistant filter layer according to the invention.
Figure 2:
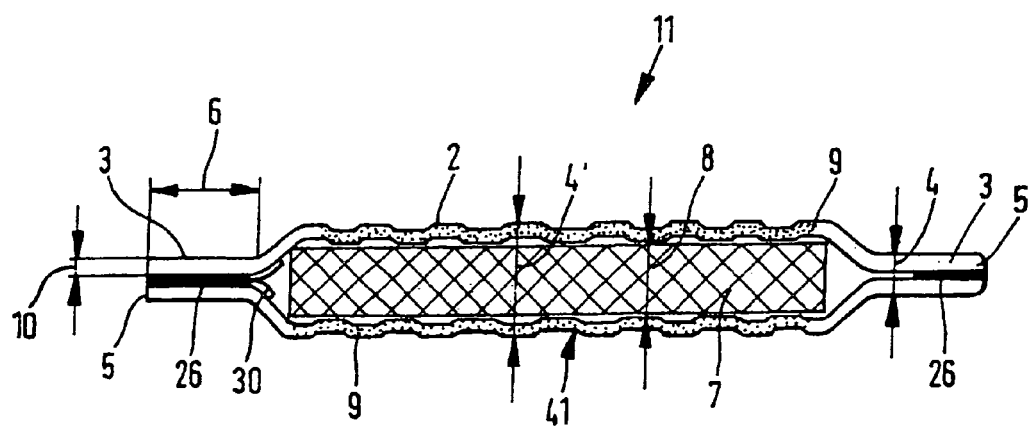
FIG. 2 is a diagrammatic, sectional view of a further embodiment of the filter layer having a sandwich structure.

Referring now to the figures of the drawing in detail and first, particularly, to FIG. 1 thereof, there is shown an embodiment of a filter layer 1 according to the invention, through which a fluid can flow at least in a filter section 2 (as indicated by a direction of flow 35). The filter layer 1 is at least in part constructed from a porous material (see dotted filter region 2) and has two boundary regions 3 in the vicinity of opposite edges 5. The boundary regions 3 have been compressed by a compressive force 29 (indicated by the arrows 29), and consequently have a reduced layer thickness 4 compared to the filter section 2 (FIG. 2). The compression is signaled by the pores or cavities illustrated in section, which are significantly smaller in the boundary region 3 than in the filter section 2.

FIG. 2 diagrammatically depicts a sectional view through a further embodiment of the filter layer 1, which is configured as a sandwich structure 11, the filter layer 1 having two metal layers 9 which form a sleeve around a fiber layer 7. The metal layers 9 each have two boundary regions 3, with the metal layers 9 being connected to one another by technical joining in the boundary regions 3. The connection by technical joining is in this case ensured by a brazing material 26, with a brazing stop 30 being provided outside the boundary region 3, preventing the brazing material 26 from reaching the vicinity of the fiber layer 7 during a heat treatment. The boundary region 3 extends from an edge 5 of the metal layer 9 over a boundary width 6 of preferably between 3 and 15 mm. With regard to the material thicknesses, it can be explained with reference to FIG. 2 that the metal layers 9 are configured, for example, as metal foils and have a thickness 10 of less than 0.04 mm. Furthermore, it can be seen that the fiber layer 7 has a fiber layer thickness 8 that is preferably in the range from 0.01 mm to 1 mm.

FIG. 2 shows that the metal layer 9 is provided with flow-guiding surfaces 41. This is configured in particular as a microstructure. In the embodiment illustrated, the microstructure or the flow-guiding surfaces 41 fulfil two functions. First, the exhaust gas that flows by is diverted or swirled up, so that partial gas streams are diverted toward or penetrate through the adjacent porous wall, in particular the filter layer 7 according to the invention. Furthermore, it can be seen that with a microstructure of this type it is also possible to effect a clamping action with respect to the inner fiber layer 7. This improves the stability of the fiber layer 7. Moreover, this enables the porosity of the metal layers 9 to be increased, since the clamping forces which are additionally introduced already sufficiently prevent any possible detachment phenomena in the fiber layer 7. The filter layer 1, which in FIG. 2 is configured as a sandwich structure 11, has two layer thicknesses 4, 4', with the layer thickness 4 in the region of the boundary region 3 being significantly smaller than the layer thickness 4' in the region of the filter section 2. FIG. 2 illustrates a particular embodiment, since the fiber layer 7 does not extend into the boundary regions 3.

Figure 3:
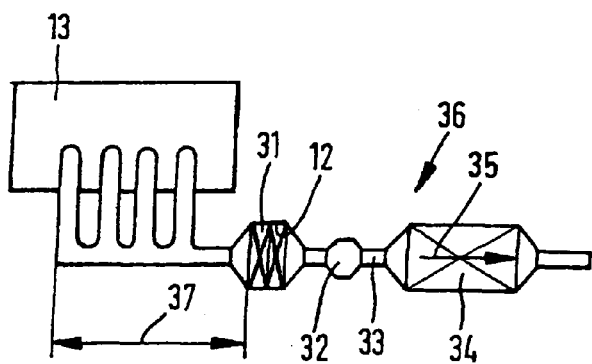
FIG. 3 is an illustration diagrammatically depicting an exhaust installation.

FIG. 3 diagrammatically depicts the structure of an exhaust system 36 for an internal combustion engine 13. The internal combustion engine 13 of this type is preferably configured as a diesel engine. In a direction of flow 35 of the exhaust gas, the exhaust system 36 contains the following components: an upstream oxidation catalytic converter 31, a filter body 12 according to the invention, a turbocharger 32, and a further catalytic converter 34.

The individual components may be disposed in separate casings or may be partially combined with one another in a single casing, and are connected to one another via an exhaust pipe 33. As has already been stated in the introduction, it is particularly advantageous for the filter body 12 to be disposed as close as possible to the internal combustion engine 13. A distance 37 from the internal combustion engine 13 of less than 0.7 m, in particular even less than 30 cm, is particularly suitable in this respect. With the individual components disposed in this way, first a sufficient quantity of nitrogen dioxide is made available with the aid of the oxidation catalytic converter 31, ensuring (continuous) regeneration of the accumulated soot particulates in the filter body 12 disposed immediately downstream. The downstream catalytic converter 34 may, for example, also be configured as a hybrid converter, in which case it has partial regions with different heat capacities. In this context, it is to be configured in such a way that its heat capacity increases in the direction of flow.

Figure 4:
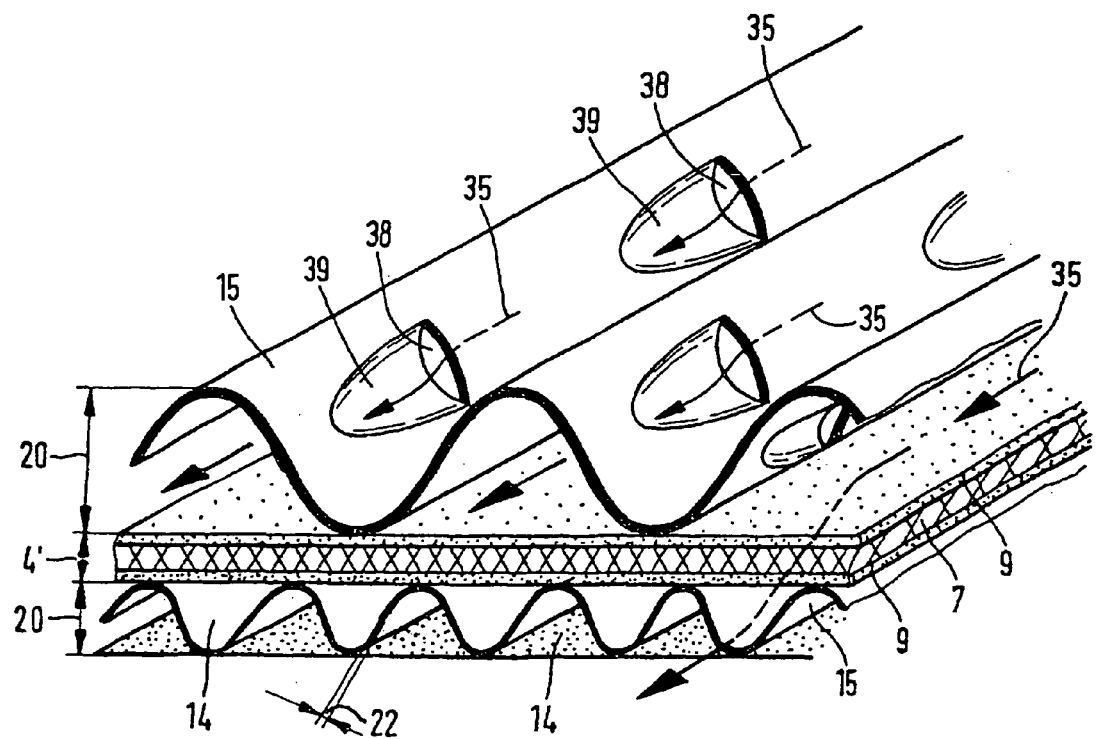
FIG. 4 is a diagrammatic, perspective view of a detail of an embodiment of the filter body according to the invention.

FIG. 4 shows a diagrammatic and perspective illustration of a further embodiment of the filter body 12 according to the invention. The filter body 12 in this case contains sheet-metal foils 15, between which there is in each case one filter layer 1 according to the invention. In the embodiment illustrated, the filter layer 1 is formed with the two metal layers 9 and the fiber layer 7 disposed between them; the connection by technical joining in the boundary region cannot be seen on account of the sectional illustration. In the excerpt illustrated here, the filter layer 1 is illustrated only in the filter section 2, and consequently in FIG. 4 only the layer thickness 4' is visible.

The sheet-metal foils 15 have a constant material thickness 22 and are in this case are provided with a structure, while the filter layer 1 has a substantially smooth surface. The structure of the sheet-metal foils 15 helps to form passages 14 through which an exhaust gas can flow in a direction of flow 35. The sheet-metal foils 15 in this case have different heights 20 of the structure, so that the passages 14 which are formed are matched to the characteristics of the incoming flow of exhaust gas. The embodiment illustrated here substantially shows a detail of an open filter body. This property is described by the fact that there is a freedom of flow of at least 20%. In this context, the term freedom of flow results in that in any desired cross section it is possible to see through at least 20% of the area, i.e. at least 20% of the area is free of internal fittings, such as diverting surfaces 39 or the like. In other words, this also results in that when a particulate filter of this type is viewed from the end side, it is possible to see through at least some of the passages, provided that the internal fittings are all in approximately the same installation position, i.e. are disposed aligned one behind the other. This is typically the case with honeycomb bodies made from at least partially structured sheet-metal layers. However, the freedom of flow, in the case of internal fittings that are not aligned with one another, does not necessarily mean that it is actually possible to see through part of a honeycomb body of this type. The sheet-metal foils 15 are provided with apertures 38 and the diverting surfaces 39 which divert the exhaust-gas stream toward the filter layer 1. This produces pressure differences which cause partial flows of exhaust gas to penetrate through the filter layer 1, so that soot particulates or the like remain and accumulate in the fiber layer 7.

Figure 5:
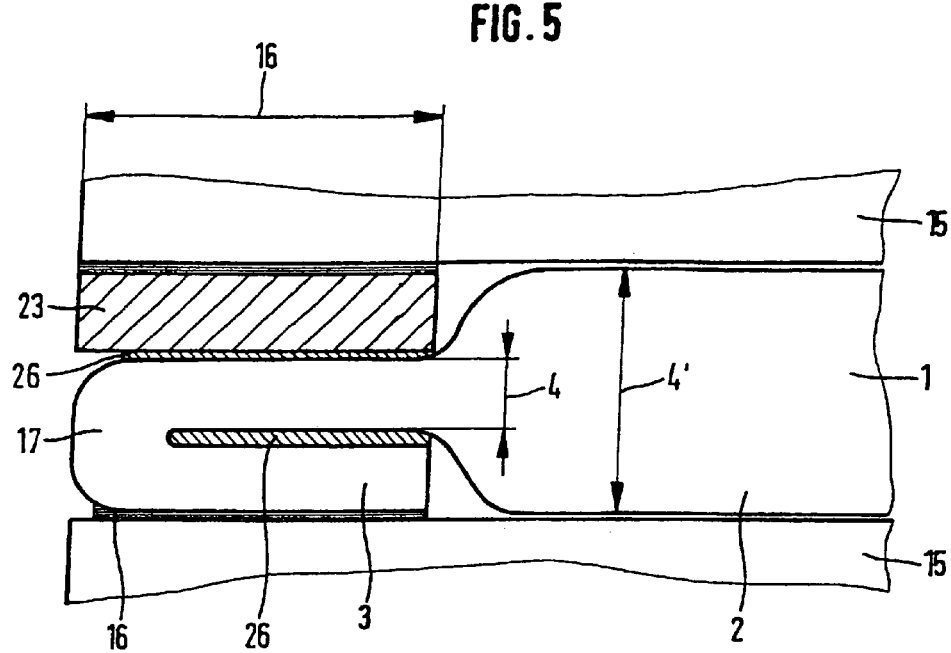
FIG. 5 is a diagrammatic, detailed, sectional view of a further embodiment of the filter body.

FIG. 5 diagrammatically depicts a detailed view of a further embodiment of the filter body 12, in which the filter layer 1 according to the invention is disposed between two sheet-metal foils 15. The filter layer 1 once again has two layer thicknesses 4, 4' with the layer thickness 4 in the boundary region 3 being configured to be less than in the filter section 2. In a connecting section 16, the sheet-metal layers 15 are connected, in particular brazed (using a brazing material 26), to the filter layer 1 directly or via a compensation layer 23, which in this case is additionally disposed in the boundary region 3 or the connecting region 16. In this case, the sheet-metal foils 15, the compensation layer 23 and the filter layer 1 end flush at their end sides. The thin boundary region 3 of the filter layer 1 shown is substantially configured to be twice as long as the connecting section 16, with a deformation region 17 having been formed, so that the boundary region 3 at least partially overlaps itself. The overlapping partial regions of the edge region now bear against one another and are even brazed together.

On account of the fact that the layer thickness 4 in the embodiment illustrated corresponds to approximately ⅓ of the layer thickness 4' in the filter section, bending over or folding the boundary region 3 allows the filter layer 1 to be connected directly to the adjacent sheet-metal layer 15 at least on one side. In this respect, the boundary region 3 now fills up ⅔ of the layer thickness 4', so that the additional compensation layer 23 now bridges the remaining third and there is then an indirect connection between the filter layer 1 and the opposite sheet-metal foil 15. As an alternative to an embodiment of this type, it is also possible for the (undeformed) boundary region 3 to be indirectly connected to the adjacent sheet-metal foils 15 on both sides by a compensation layer 23, in which case the compensation layer 23 is preferably configured with a deformation region, so that the deformation region projects around the end-side end of the boundary region 3, so that a single compensation layer 23 simultaneously fills up both distances between the boundary region 3 and the sheet-metal foils 15.

Figure 6:
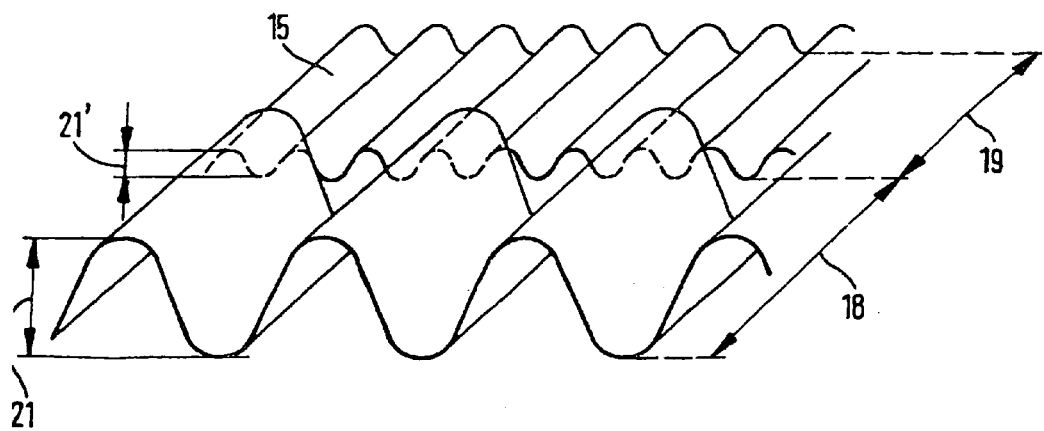
FIG. 6 is diagrammatic, perspective view of an embodiment of a sheet-metal foil for compensating for the different layer thicknesses of the filter layer.

FIG. 6 shows a diagrammatic and perspective view of an embodiment of the sheet-metal foil 15 for compensating for the different layer thicknesses 4, 4' of the non-illustrated filter layer 1. The structured sheet-metal layer 15 is disposed adjacent to the filter layer 1, in the manner that has already been explained, and is used to compensate for the different layer thicknesses thereof. For this purpose, the sheet-metal foil 15, in a zone 18, has a structure height 21 which is greater than that of a remaining zone 19, with a non-illustrated material thickness 22 of the sheet-metal foil 15 preferably being equal in the various zones 18, 19.

Accordingly, the magnitude of the structure height 21 of the zone 18 is to be increased in such a way that contact of the metal foil 15 is ensured in the zone 18 or the boundary region 3 of the filter layer 1. For example, if the starting point used is an embodiment of the filter layer 1 as shown in FIG. 5, it is advantageous for the structure height 21 in the zone 18 to be greater than the structure height 21' by an amount which substantially corresponds to the difference between the layer thickness 4' and the layer thickness 4. In this case, it is advantageously possible to dispense with the need for additional compensation layers 23.

Figure 7:
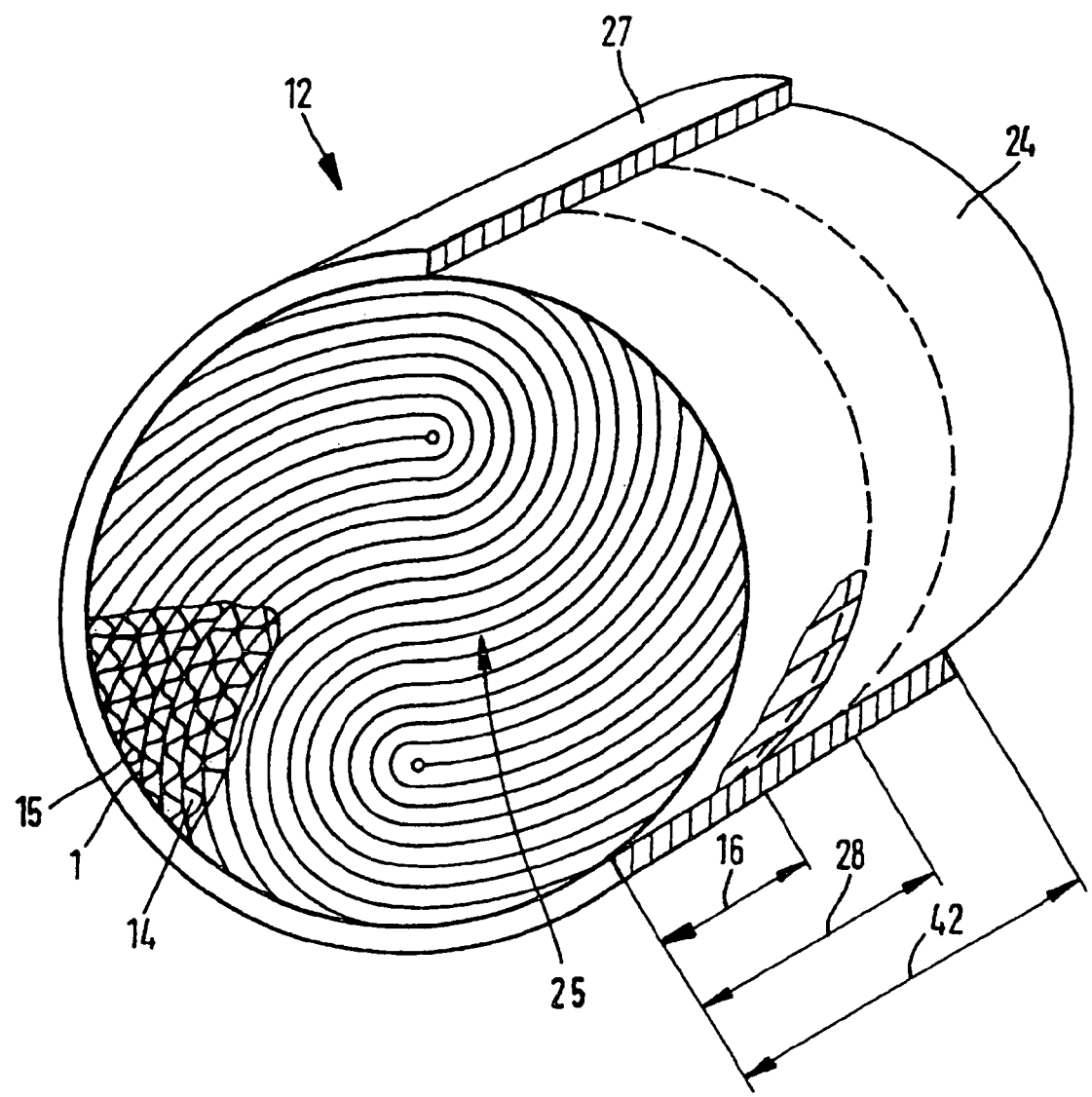
FIG. 7 is a diagrammatic, perspective view of an embodiment of the filter body.

FIG. 7 shows a diagrammatic and perspective view of an embodiment of the filter body 12 that contains a honeycomb body 24 disposed in a casing 27. The honeycomb body 24 is formed with a plurality of alternately disposed filter layers 1 and structured sheet-metal foils 15, which are first stacked and then wound together in such a way as to produce a substantially cylindrical configuration of the honeycomb body 24. As an alternative, it is also possible to produce conical, rectangular or oval configurations, and it is also possible in each case to provide just one sheet-metal foil 15 and one filter layer 1, which in particular are wound up together in helical form. The structured sheet-metal foils 15 and the filter layers 1 delimit passages 14 through which an exhaust gas can flow and which extend from one end face 25 to the opposite end face 25. This ensures that it is possible to at least partially see through the passages 14. This is ensured with the freedom of flow of at least 20% as explained in the introduction.

The structured sheet-metal foils 15 and the filter layers 1 are connected to one another by technical joining, in particular brazing (preferably high-temperature vacuum brazing), in the connecting section 16. In addition, the honeycomb body 24 is attached to the casing 27 in at least one attachment region 28; in this context, it is preferable for the same technical joining process to be used (at the same time) as for the connection of the sheet-metal foils 15 and the filter layers 1 to one another. The attachment and the connections are not performed over an entire length 42 of the honeycomb body 24, with the result that even under thermal load differential expansions resulting from the different coefficients of thermal expansion of the components are possible. The result of this is that no stresses that would lead to premature loss of the structural integrity of the filter body are produced in the honeycomb body 24 or between the honeycomb body 24 and the casing 27.

FIGS. 8A–8F diagrammatically depict the sequence of one configuration of the process according to the invention for producing the filter body 12. This process includes producing at least one heat-resistant filter layer 1.

Figure 8A:
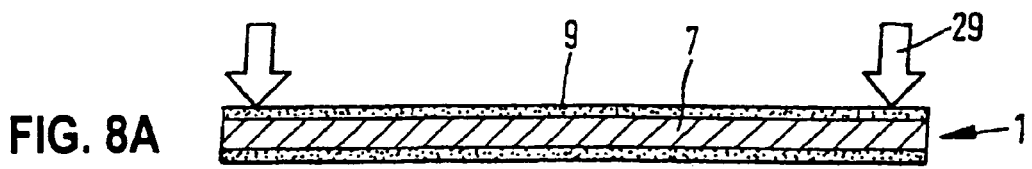
FIGS. 8A–8F are illustrations diagrammatically depicting a sequence of one embodiment of the process according to the invention for producing a filter body.

According to FIG. 8A, the filter layer 1 is produced by a central fiber layer 7 being assigned two metal layers 9 which delimit the fiber layer 7 with respect to the outside, so that a type of protective sleeve is formed (see sandwich structure). The filter layer 1 is preferably produced from strip-like or sheet-like raw materials (metal sheets, fabrics, etc.), by these materials being cut to the desired dimensions.

Figure 8B:
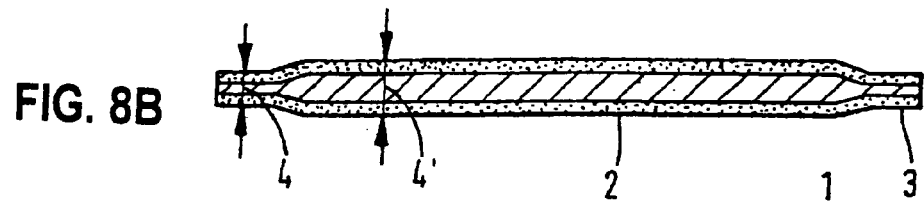
Figure 8C:
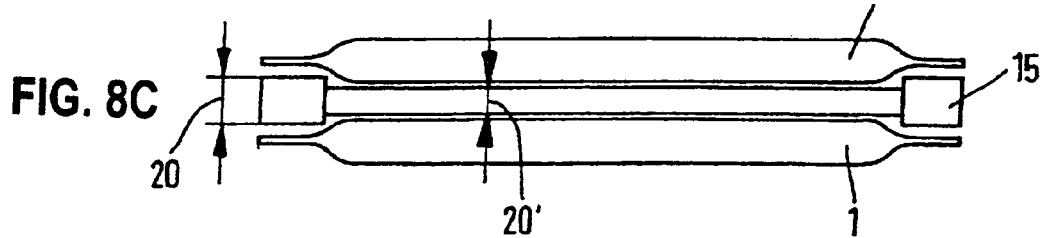
Figure 8D:
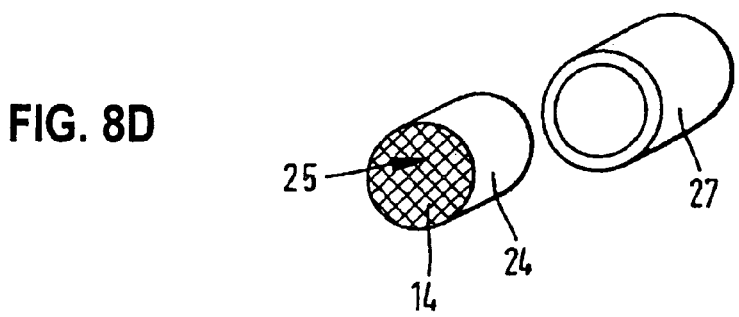

At least one boundary region 3 of the filter layer 1 of reduced layer thickness 4 is formed in FIG. 8B. The two opposite boundary regions 3 with reduced layer thicknesses 4 are formed by the application of a compressive force 29 to the filter layer 1 (indicated by arrows) in the boundary regions 3. This significantly compresses at least the fiber layer, so that these boundary regions 3 become substantially impervious to a brazing material. Numerous production processes are suitable for such a compression process; in this context, pressing using a roller may be mentioned by way of example.

Next, a way for compensating for the different layer thicknesses 4, 4' of the at least one filter layer 1 is provided.

As has been explained above, substantially two different principles, or alternatively a combination of these principles, are suitable for this purpose. In the configuration illustrated in FIG. 8C, the different layer thicknesses 4, 4' of the at least one filter layer 1 are compensated for exclusively by the layers disposed between the filter layers 1. Accordingly, the sheet-metal foil 15 has a plurality of end-side zones with a height 20 which is configured to be greater than the height 20' in the central or intervening remaining zone. In this respect, the adjacent layers bear against one another over the entire length, so that relative movement of the layers with respect to one another is avoided even after connections by joining have been formed (examples of such movements include flapping or vibrating of the boundary regions of the filter layers 1).

The stacking and/or winding at least one filter layer 1 and at least one structured sheet-metal foil 15 to form a honeycomb body 24 with passages 14 through which an exhaust gas can flow is now preformed. The sheet-metal foils 15 and the filter layers 1 are then stacked in the manner illustrated in FIG. 8C and then shaped into a cylindrical honeycomb body 24. The boundary regions are at least in part to be disposed in a plane which is parallel to an end face 25 of the honeycomb body 24, and in particular all the boundary regions adjoin at least one end face 25. The structure of the sheet-metal foils 15 leads to the formation of passages 14 through which an exhaust gas can flow, ensuring a freedom of flow of at least 20%. With regard to the winding process, reference should also be made to known techniques that are already in widespread use for the production of a metallic honeycomb structure as a catalyst support body. The honeycomb body 24 is then also introduced into a casing 27 (see FIG. 8D), so that the honeycomb body 24 and the casing 27 can then together be provided with a bonding agent and/or the brazing material 26.

Figure 8E:
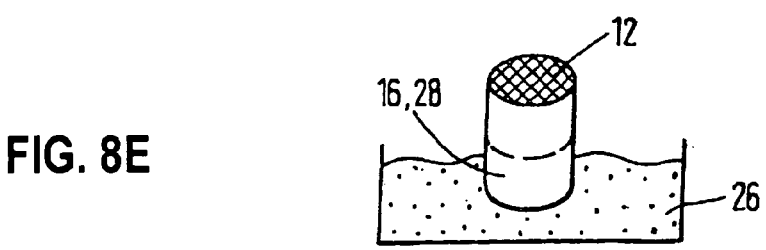
Figure 8F:
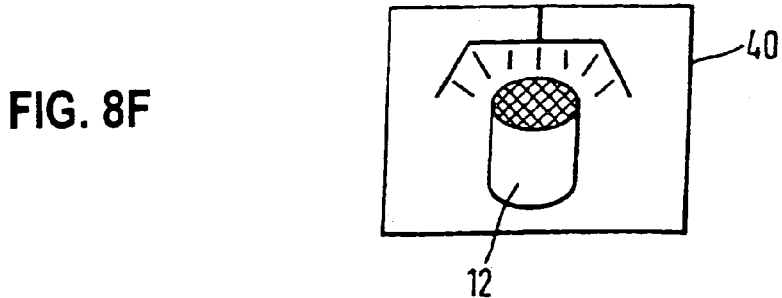

A brazing material 26 is supplied in at least one connecting section 16 connecting the at least one filter layer 1 to the at least one sheet-metal foil 15. For this process step too, reference should be made to the known technique for applying a brazing material to metallic honeycomb structures which are used, for example, as catalyst support bodies in exhaust systems for automobiles. In addition to the use of solid strips of the brazing material or the like, in this context it is also preferable to use a brazing material in powder form. In this case, first a bonding agent is applied in the contact regions between the layers which are to be connected to one another, with the filter body 12 which has been pretreated in this way then being brought into contact with the pulverulent brazing material 26, which adheres to the bonding agent (FIG. 8E).

The honeycomb body 24 is then heated to form brazing joints in the at least one connecting section 16. To form corrosion-resistant and temperature-resistant connections between the layers (connecting section 16) and to attach them to the casing 27 (attachment region 28), it has proven particularly expedient to use a high-temperature vacuum process. In this case, the filter body 12 is heated in vacuo in a furnace 40 at temperatures of up to 1200° C. and is then cooled again. The heating and cooling process usually takes place in accordance with a specifiable pattern that can be described using temperature transients and holding times.

The filter body 12 produced in this way satisfies the very high thermal and dynamic requirements, for example in exhaust systems of diesel engines as are currently used in automotive engineering. This applies in particular with a view to the filter body being disposed close to the engine, in which case the filter body can be regenerated continuously. This configuration of the open filter body causes the reaction partners for converting the soot particulates and the soot particulates themselves to dwell in the filter body for a longer period of time, so that the probability of all the required reaction partners and ambient conditions being present is increased. Tests have confirmed this, demonstrating a filter efficiency of, for example, over 50%.

Therefore most passenger automobiles that are currently in use will continue to be able to comply with the most stringent exhaust emission guidelines and/or statutory regulations even in the future. In this respect, the filter body is particularly suitable for retrofitting.

We claim:

1. A heat-resistant filter layer, comprising:
    a fiber material being at least partially pervious to a fluid;
    at least one filter section incorporating said fiber material; and
    at least one boundary region extending from said filter section, said boundary region having a first layer thickness being less than a second layer thickness of said filter section, and said boundary region containing a compressed or compacted fiber assembly.

2. The heat-resistant filter layer according to claim 1, wherein said boundary region, starting from an edge of the filter layer, has a boundary width of at most 30 mm.

3. The heat-resistant filter layer according to claim 1, wherein said filter section has at least one fiber layer formed of said fiber material and said fiber layer has a fiber layer thickness of at most 3 mm.

4. The heat-resistant filter layer according to claim 3, further comprising at least one metal layer delimiting the filter layer on an outside and has a metal layer thickness of at most 0.05 mm.

5. The heat-resistant filter layer according to claim 1, further comprising a sandwich structure containing at least one fiber layer formed of said fiber material and at least one metal layer.

6. The heat-resistant filter layer according to claim 1, wherein said first layer thickness is less than 60% of said second layer thickness.

7. The heat-resistant filter layer according to claim 1, wherein said first layer thickness is less than 50% of said second layer thickness.

8. The heat-resistant filter layer according to claim 1, wherein said first layer thickness is less than 35% of said second layer thickness.

9. The heat-resistant filter layer according to claim 1, wherein said boundary region, starting from an edge of the filter layer, has a boundary width of at most 20 mm.

10. The heat-resistant filter layer according to claim 1, wherein said boundary region, starting from an edge of the filter layer, has a boundary width of at most 10 mm.

11. The heat-resistant filter layer according to claim 1, wherein said boundary region, starting from an edge of the filter layer, has a boundary width of at most 5 mm.

12. The heat-resistant filter layer according to claim 1, wherein said filter section has at least one fiber layer formed of said fiber material and said fiber layer has a fiber layer thickness of at most 1 mm.

13. The heat-resistant filter layer according to claim 1, wherein said filter section has at least one fiber layer formed of said fiber material and said fiber layer has a fiber layer thickness of at most 0.5 mm.

14. The heat-resistant filter layer according to claim 3, further comprising at least one metal layer delimiting the filter layer on an outside and has a metal-layer thickness of at most 0.03 mm.

15. The heat-resistant filter layer according to claim 3, further comprising at least one metal layer delimiting the filter layer on an outside and has a metal-layer thickness of at most 0.015 mm.

16. A filter body for purifying exhaust gases from an internal combustion engine, the filter body comprising:
at least partially structured layers being at least one of stacked and wound to form passages through which the exhaust gases can flow, said layers including at least one heat-resistant filter layer, said heat-resistant filter layer comprising:
a fiber material being at least partially pervious to a fluid;
at least one filter section incorporating said fiber material; and
at least one boundary region extending from said filter section, said boundary region having a first layer thickness being less than a second layer thickness of said filter section, and said boundary region containing a compressed or compacted fiber assembly.

17. The filter body according to claim 16, wherein said layers include at least one structured sheet-metal foil and said filter layer being a substantially smooth filter layer, said layers connected to one another by brazing or welding, in at least one connecting section.

18. The filter body according to claim 17, wherein said connecting section is disposed in said boundary region of said filter layer.

19. The filter body according to claim 17, further comprising means (17, 18, 19, 20, 21, 23) for compensating for differences in the first and second layer thicknesses of said filter layer.

20. The filter body according to claim 19, wherein said boundary region has a deformation region which at least partially overlaps itself and is brazened together.

21. The filter body according to claim 19, wherein said structured sheet-metal foil has a zone disposed adjacent to said boundary region and a remaining zone, said zone of said structured sheet-metal foil has a greater height than a remaining zone of said structured sheet-metal foil.

22. The filter body according to claim 21, wherein said zone of said structured sheet-metal foil has structures with a structure height being greater than structures of said structured sheet-metal foil in said remaining zone, a material thickness of said structured sheet-metal foil being equal in said zone and said remaining zone.

23. The filter body according to claim 16, further comprising at least one additional compensation layer disposed adjacent to said boundary region of said filter layer.

24. A process for producing a filter body, which comprises the steps of:
producing at least one heat-resistant filter layer according to claim 1;
forming, in the filter layer, at least one boundary region, the boundary region having a reduced layer thickness in comparison to remaining parts of the filter layer;
providing means for compensating for different layer thicknesses of the filter layer;
stacking and/or winding the filter layer and at least one structured sheet-metal foil to form a honeycomb body having passages formed therein through which an exhaust gas can flow;
supplying a brazing material in at least one connecting section between the filter layer and the structured sheet-metal foil; and
heating the honeycomb body to form brazing joints in the connecting section.

25. The process according to claim 24, which further comprises:
introducing the honeycomb body into a casing before the brazing material is supplied, and while the brazing material is being supplied, disposing the casing in at least one attachment region for attaching at least one of the filter layer and the structured sheet-metal foil to the casing, so that brazing joints are generated during heating in the attachment region.

26. The process according to claim 24, which further comprises:
forming the boundary region having the reduced layer thickness by applying a compressive force to the filter layer in the boundary region.

27. The process according to claim 26, which further comprises producing the means for compensating by deforming the boundary region.

28. The process according to claim 24, which further comprises producing the means for compensating by disposing at least one compensation layer between the filter layer and the structured sheet-metal foil.

29. The filter body according to claim 16, wherein said passages are alternately closed off.

* * * * *